United States Patent
Gottwald et al.

(10) Patent No.: US 7,167,125 B2
(45) Date of Patent: Jan. 23, 2007

(54) PULSE RADAR ARRANGEMENT

(75) Inventors: Frank Gottwald, Weissach (DE);
Michael Schlick, Pfinztal (DE); Tore Toennesen, Reutlingen (DE); Jens Haensel, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 10/488,351

(22) PCT Filed: Jun. 21, 2002

(86) PCT No.: PCT/DE02/02296

§ 371 (c)(1),
(2), (4) Date: Oct. 4, 2004

(87) PCT Pub. No.: WO03/027702

PCT Pub. Date: Apr. 3, 2003

(65) Prior Publication Data
US 2005/0035899 A1 Feb. 17, 2005

(30) Foreign Application Priority Data
Aug. 29, 2001 (DE) ................ 101 42 170

(51) Int. Cl.
*G01S 7/28* (2006.01)
(52) U.S. Cl. ........................ 342/70; 342/134; 342/137; 342/202

(58) Field of Classification Search ........ 342/70
See application file for complete search history.

(56) References Cited

U.S. PATENT DOCUMENTS

| | | | |
|---|---|---|---|
| 6,067,040 A | 5/2000 | Puglia | |
| 6,587,072 B1* | 7/2003 | Gresham et al. | 342/70 |
| 6,720,908 B1* | 4/2004 | Puglia | 342/70 |
| 6,867,730 B1* | 3/2005 | Gottwald et al. | 342/159 |
| 2002/0130811 A1* | 9/2002 | Voigtlaender et al. | 342/159 |
| 2003/0151542 A1* | 8/2003 | Steinlechner et al. | 342/70 |

FOREIGN PATENT DOCUMENTS

| | | |
|---|---|---|
| DE | 199 26 787 | 1/2001 |
| EP | 685 9 30 | 12/1995 |
| WO | WO 00 68707 | 11/2000 |

* cited by examiner

*Primary Examiner*—Thomas H. Tarcza
*Assistant Examiner*—Matthew M. Barker
(74) *Attorney, Agent, or Firm*—Kenyon & Kenyon LLP

(57) ABSTRACT

A pulse radar system has a high-frequency source, which supplies a continuous high-frequency signal and is connected on the one side with a transmission-side pulse modulator and on the other side with two separately controllable pulse modulators in at least one receive path. Mixers are situated downstream from pulse modulators, respectively. The mixers evaluate a radar pulse reflected by an object together with the signal of the high-frequency source. The pulse radar system allows different modes of operation that may be changed in a simple manner.

17 Claims, 3 Drawing Sheets

PRIOR ART

PULSE RADAR ARRANGEMENT

FIELD OF THE INVENTION

The present invention is based on a pulse radar system, in particular for close-range pulse radar applications in motor vehicles.

BACKGROUND INFORMATION

Radar sensors are used in automotive engineering for measuring the distance to objects and/or the relative speed with respect to such objects outside of the motor vehicle. Examples of objects include preceding or parked motor vehicles, pedestrians, bicyclists, or devices within the vehicle's surroundings. The pulse radar functions, for example, at 24.125 GHz and may be used for the following functions, stop & go, precrash, blind spot detection, parking assistant, and backup aid.

FIG. 1 shows a schematic representation of a radar device having a correlation receiver of the related art. A pulse generation 302 causes a transmitter 300 to transmit a transmission signal 306 via an antenna 304. Transmission signal 306 hits a target object 308 and is reflected. Received signal 310 is received by antenna 312. This antenna 312 may be identical to antenna 304. After received signal 310 is received by antenna 312, the signal is transmitted to receiver 314 and subsequently supplied via a unit 316 having low pass and analog/digital conversion to a signal evaluation 318. The special feature of a correlation receiver is that receiver 314 receives a reference signal 320 from pulse generation 302. Received signals 310, which are received by receiver 314, are mixed in receiver 314 with reference signal 320. As a result of the correlation, the time delay from the outside to reception of the radar impulses may be used as a basis for determining the distance of a target object, for example.

A similar radar device is known from German Patent No. DE 199 26 787. In this context, a transmission switch is switched on and off by the impulses of a generator so that a high-frequency wave generated by an oscillator and conducted via a fork to the transmission switch is switched through to the transmission antenna during the pulse duration. A reception unit also receives the output signal of the generator. The received signal, i.e., a radar pulse reflected by an object, is combined with the oscillator signal, which reaches the mixer via a reception switch, and evaluated during a predefined time period.

U.S. Pat. No. 6,067,040 also uses a transmission switch that is switched on and off by generator impulses. Separate paths for I/Q signals are provided for reception of the reflected radar pulses. Also in this instance, the received signal is only mixed and evaluated during a predefined time period.

SUMMARY OF THE INVENTION

The measures of the present invention enable the enhancement of the performance of known pulse radar systems. In the case of the solution according to U.S. Pat. No. 6,067,040, a reception-side pulse modulator or pulse switch is positioned upstream from a power splitter for splitting the LO (local oscillator) signal to the mixers in the reception-side IQ branches. This has the disadvantage that it is not possible to realize a multi-receiver system or to simultaneously evaluate a plurality of different reception cells. However, in the case of the solution of the present invention, two separately controllable, reception-side pulse modulators are provided via which the continuous signal of the high-frequency source, which also controls the transmission-side pulse modulator, may be switched to one respective reception-side mixer. This means that in this instance, as opposed to U.S. Pat. No. 6,067,040, the signal of the high-frequency source may be applied to every mixer in a reception branch at different instants, each mixer also being able to be connected to the signal of the high-frequency source for different durations. In this manner, different modes of operation are made possible and may also be changed quickly and flexibly. Such a change may be effected simply by varying the delay time of the time-delay circuits via which the reception-side pulse modulators may be controlled. A plurality of operating modes may also run automatically in a consecutive order according to a predefined scheme.

If both pulse modulators/switches are switched at the same time, the receive path, which includes two reception branches of the pulse radar system, functions in the usual manner. If the switches are switched at different times or they have opening times of different durations, all capabilities of a multi-receiver system are available.

A plurality of settings or modes may be set. A previous detection range of, for example, 7 m may now be divided, e.g. into 0 to 4 m and 4 to 7 m. An expansion of the detection range does not automatically result in an extension of the measurement times. One channel is able to cover the 0 to 4 m range, while the other channel having a longer measurement time, for example, covers the 7 to 14 m range. In special cases, the radar system of the present invention functions as a customary I/Q demodulator. Furthermore, parallel to the distance measurement, a channel may be responsible for the CV (closing velocity) measurement, which may be used to determine radial velocity.

Therefore, in particular:
- a plurality of receiving channels may be operated in parallel;
- I/Q demodulator operation and individual operation are rendered possible;
- a plurality of antennas may be operated in parallel (multi-receiver principle);
- the pulse duty factor may be selected to be different in the transmit and receive paths;
- the pulse duty factor may be one (Doppler radar only);
- the radar pulses may vary with respect to their repetition frequency and/or pulse duration to increase the level of interference protection;
- a plurality of reception cells may be evaluated at the same time when using double or triple transmission pulse power;
- the power of the reception pulses may be split among a plurality of receive paths in the case of target objects that are too strong in close range so that overloading of subsequent received-signal amplifiers is prevented;
- a PN code may be provided with a reception sequence corresponding to the set distance;
- a cross echo analysis is possible;
- the superimposition of two orthogonal codes in the transmit path may be provided as well as evaluation of in each case only one of the transmitted orthogonal codes per reception branch on the reception side.

DETAILED DESCRIPTION

Figure 1:
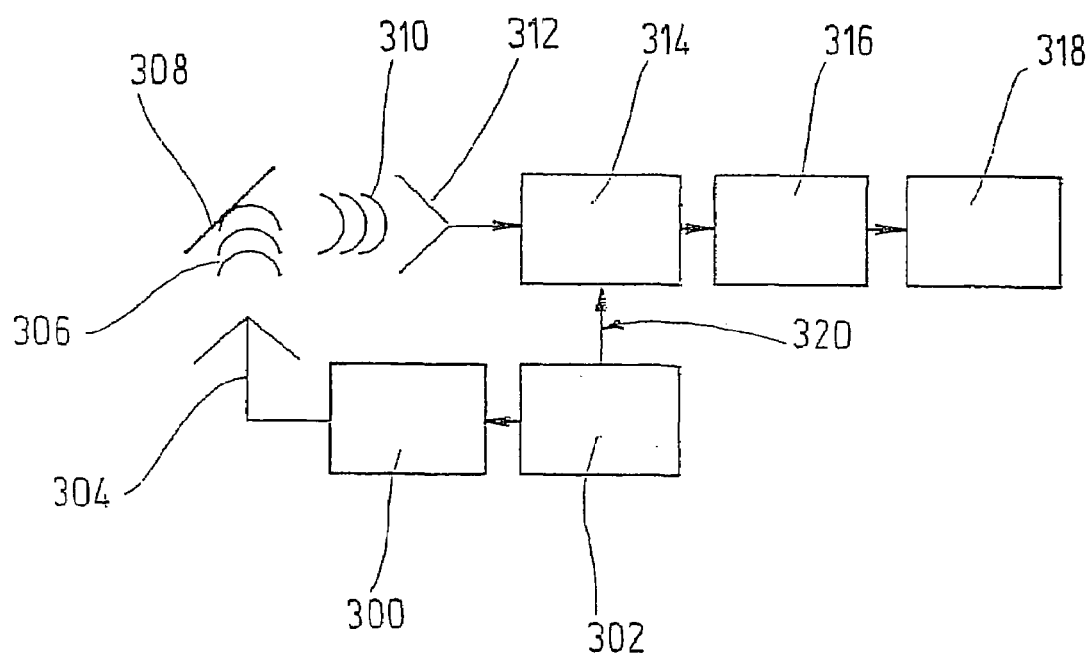
FIG. 1 shows a schematic representation of a radar device of the related art.
Figure 2:
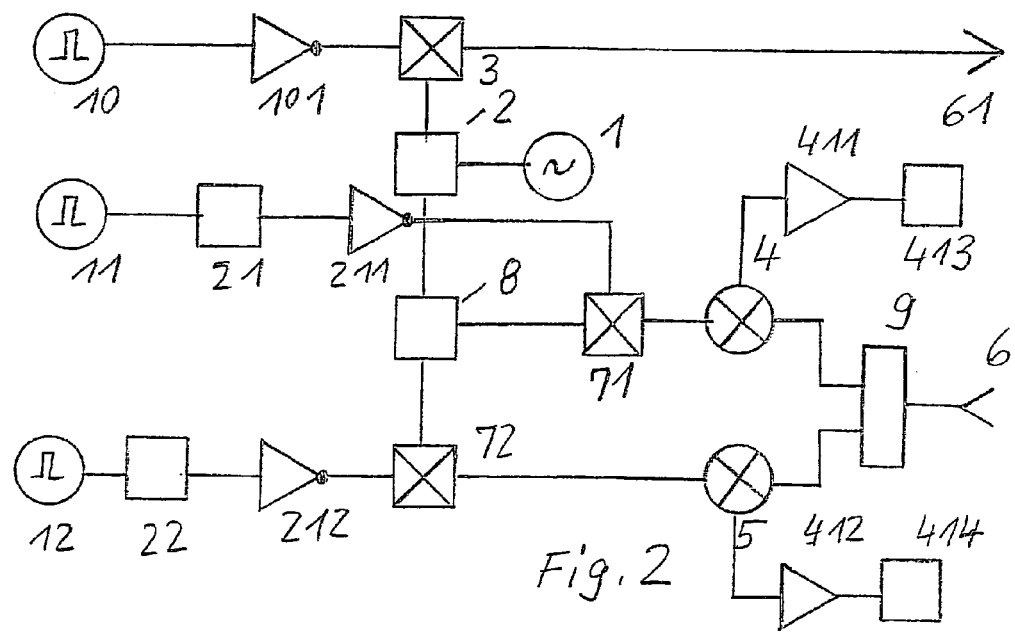
FIG. 2 shows a block diagram of a pulse radar system according to the present invention.

The radar sensor of the present invention shown in FIG. 2 has a high-frequency source 1, which provides a continuous high-frequency signal (CW signal). Via a signal splitter in the form of a split connection 2, this high-frequency signal reaches on the one side the input of a transmission-side pulse modulator 3 for transmitting radar impulses to transmission antenna 61 and on the other side via a further signal splitter 8 directly to the inputs of two reception-side pulse modulators 71 and 72. The outputs of these pulse modulators 71 and 72 are connected to a mixer 4 and 5, respectively. The outputs of these mixers 4 and 5 are then connected via a power splitter 9, e.g. a 3 dB signal splitter, to receiving antenna 6. Two reception branches are provided with two pulse modulators 71, 72 and two mixers 4 and 5 in order to achieve I/Q (inphase/quadrature phase) capability of the radar system. Signal splitter 9 is used for the reception-side splitting of the antenna signal into the quadrature component signals I and Q. Mixers 4 and 5 are designed, for example, as balanced mixers in the form of a RAT-RACE hybrid (see in particular European Patent Application No. EP 685 9 30, which describes the system of such a RAT-RACE hybrid). The continuous signal of high-frequency source 1 may be switched via pulse modulators 71 and 72 in each case to one of mixers 4 and 5. Transmission-side pulse modulator/switch 3 is controlled via a pulse signal source 10 and a transmission gate circuit 101. Pulse modulators 71 and 72 are each controlled separately by pulse signal sources 11 and 12, to which a time-delay circuit 21 and 22 as well as a reception gate circuit 211 and 212 are respectively assigned.

If a radar pulse reflected by an object travels from antenna 6 across power splitter 9 to mixers 4 or 5, the envelope curve of the received pulse (IF signal) is formed from the continuous signal of the high-frequency source and the reflected radar pulse during the time in which the pulse modulator allows the signal of high-frequency source 1 to pass. This mixed signal/envelope curve is amplified by an IF amplifier 411 or 412 with a bandwidth of, e.g. 10 kHz, and supplied to a reception scanner 413 or 414. This occurs separately for the I and the Q channel (separate receive and evaluation paths for the received I and Q signal).

Time-delay circuits 21 and 22 are necessary to be able to compare the duration of the received radar pulse and to obtain distance information therefrom. After a defined time period following the generation of the transmission pulse that corresponds with the pulse duration for the desired distance cell, a particularly short scanning pulse is applied to a broadband scanner 413 and 414, respectively, and the scanner scans the output signal of IF amplifier 411 and 412, respectively, in the selected distance cell. In this context, the duration of the scanning pulse is in the order of magnitude of the transmission and IF pulse width. This occurs at the rate of transmission pulse generation, but accordingly delayed. The variation in delay time allows the scanning of the desired distance range in the same manner as SRR (short range radar). The scanner detects from 0 different voltages and thus detects the pulse return after the desired duration. Incoherent pulse integration is possible and is improved by the signal to noise ratio proportionally to SQRT (n), n being the number of integrated pulses.

Figure 3:
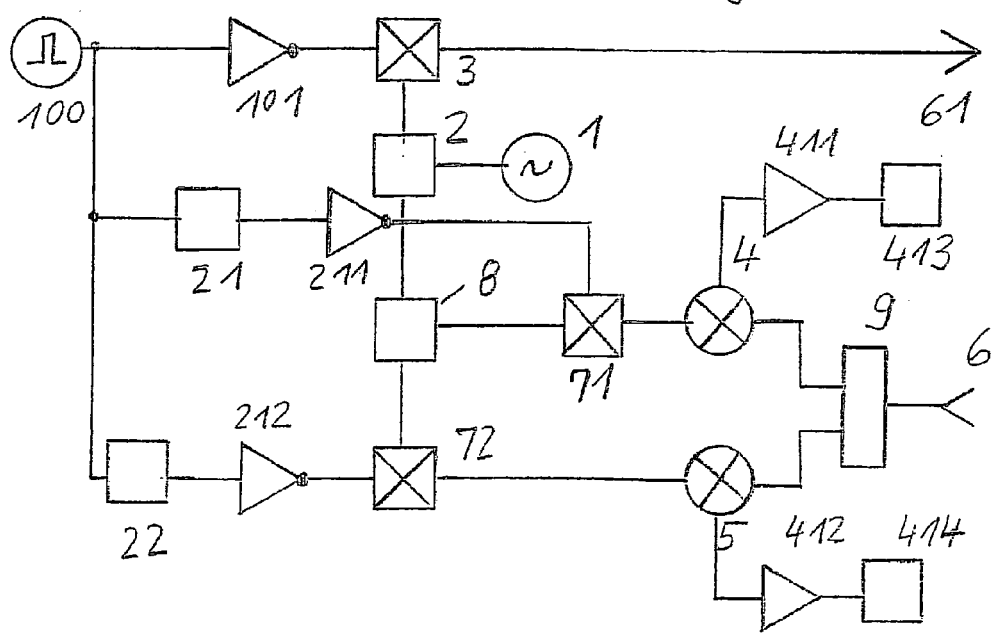
FIG. 3 shows a block diagram of a pulse radar system according to the present invention having common pulse processing.

According to FIG. 3, the control pulses for pulse modulators 3, 71, 72 may also be jointly processed by a shared pulse signal source 100. Since the delay times of time-delay circuits 21 and 22 may be selected to be different, pulse modulators 71 and 72 may be controlled independently of one another also in this instance. Of course, in an alternative, only transmission-side pulse modulator 3 may have its own pulse signal source 10, a common pulse signal source then being provided for the reception-side pulse modulators.

Figure 4:
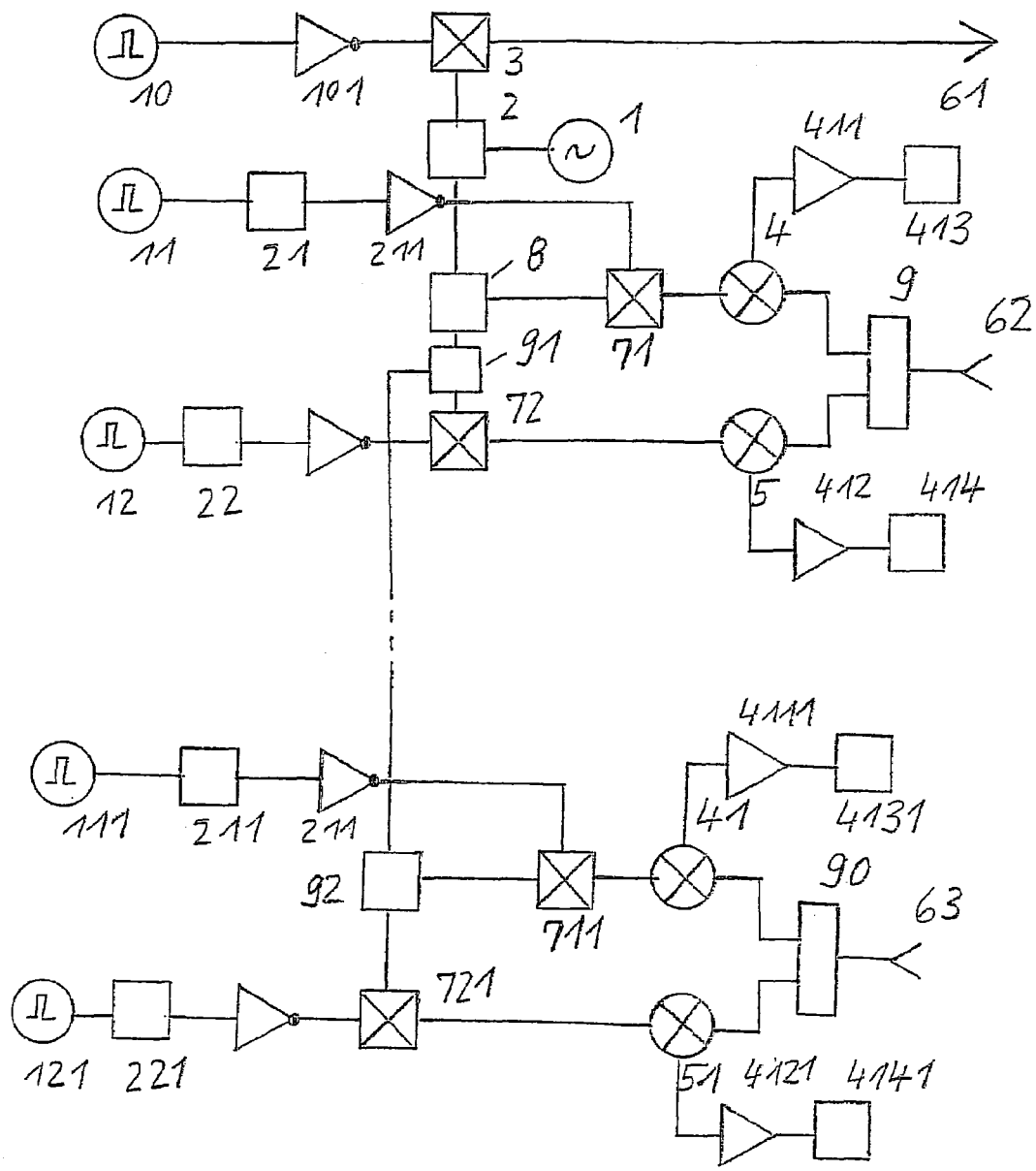
FIG. 4 shows a block diagram of a pulse radar system according to the present invention having a plurality of receive paths.

FIG. 4 shows an exemplary embodiment having a plurality of receive paths, two in this instance. The individual receive paths may be configured as shown in FIG. 2 or 3. As in FIGS. 2 and 3, every mixer 4, 5 and 41, 51, respectively, has a separate pulse modulator 71, 72 and 711, 721, respectively, which may be controlled independently of the respective other mixers of the same receive path via a corresponding pulse signal source 11, 12 and 111, 121, respectively, time-delay circuit 21, 22 and 211, 221, respectively, and reception gate 212, 213 and 214, 215, respectively. The individual receive paths may have either a common receiving antenna or each have a separate receiving antenna 62, 63. Additional downstream signal splitters 91, 92 are required to connect mixers 41, 51 of the further receive paths to high-frequency source 1, which is shared by all receive paths.

As a result of the at least two receive paths and separate control of reception-side pulse modulators 71, 72 and 711, 712, respectively, each having adjustable time-delay circuits 21, 22, 211, 221 at different delay times, different modes of operation are possible as well as a faster change between these different modes of operation as a function of the needs of the vehicle operator. As a result, in particular:
- a plurality of channels (mixers) may be operated in parallel;
- a plurality of antennas may be operated in parallel (multi-receiver principle);
- the pulse duty factor may be selected to be different in the transmission and receive paths;
- the pulse duty factor may be one (Doppler radar only);
- the transmission pulses may vary with respect to their repetition frequency and/or pulse duration in particular to increase the level of interference protection;
- I/Q demodulator operation and individual channel operation are possible;
- a plurality of reception cells may be evaluated at the same time with the same degree of sensitivity when using double or triple transmission pulse power;
- the distance cells may be adjusted by scanning or masking the received signal;
- the reception pulse power may be split in the case of target objects that are too strong in close range so that in particular overloading of subsequent amplifiers is prevented;
- a cross echo analysis is possible;

If coded sequences of pulses (PN coding) are transmitted, the modulators in the receive paths, e.g. phase rotators in this case, are controlled by a reception sequence corresponding with the set distance. This contributes significantly to the suppression of false targets. The channels monitor different distance ranges. In the event that a reception-side device is set to the PN code of a neighboring device, a cross echo analysis is possible.

Superimposition of two orthogonal codes may be provided in the transmit path, and in each case only one of the transmitted orthogonal codes is evaluated per receive path.

The transmission-side and reception-side pulse signal sources 10, 100, 11, 12, 111, 121 are phase-coupled to one another, or only the reception-side pulse signal sources 11, 12, 111, 121 are phase-coupled among one another, particularly in the case of a plurality of receive paths, in order to achieve defined time relationships particularly for the simultaneous monitoring of a plurality of reception cells.

In the present invention, a plurality of operating modes may be set consecutively according to a predefined scheme. For this purpose, only a shared control switch 400 is needed for the pulse signal sources and/or the time-delay circuits that provide in each case the time window for transmission and evaluation of the radar pulses according to the predefined scheme. The different parameters for the individual modes of operation may be loaded in a memory module provided in the control circuit or supplied by a separate memory module 401. Of course, the control of the modes of operation may also be configured to be interactive, i.e., modified parameters may be provided in a first mode of operation for further modes of operation as a function of the evaluation.

What is claimed is:

1. A pulse radar system comprising:
   a high-frequency source for emitting a continuous high-frequency signal;
   a transmission-side pulse modulator coupled on a first side of the high-frequency source for emitting radar pulses;
   at least two reception-side mixers; and
   at least two separately controllable reception-side pulse modulators coupled on a second side of the high-frequency source in reception branches, the at least two pulse modulators being adapted to switch the continuous signal of the high-frequency source in each case to one of the at least two reception-side mixers.

2. The pulse radar system according to claim 1, wherein the system is for a close-range pulse radar application for a motor vehicle.

3. The pulse radar system according to claim 1, further comprising two pulse signal sources, each of which including a separate time-delay circuit, the two pulse signal sources being for controlling the reception-side pulse modulators.

4. The pulse radar system according to claim 1, further comprising a shared pulse signal source for controlling the reception-side pulse modulators, the shared pulse signal source being connected with each of separate time-delay circuits for each one of the reception-side pulse modulators.

5. The pulse radar system according to claim 4, wherein the shared pulse signal source also provides a pulse signal for the transmission-side pulse modulator.

6. The pulse radar system according to claim 1, further comprising a quadrature power splitter situated between a receiving antenna and the reception-side mixers, so that an in-phase received signal is supplied to one of the mixers and a quadrature received signal is supplied to another of the mixers.

7. The pulse radar system according to claim 1, further comprising a signal splitter device for splitting a continuous signal of the high-frequency source to the transmission-side pulse modulator and to the reception-side pulse modulators.

8. The pulse radar system according to claim 1, further comprising a separate pulse signal source for the transmission-side pulse modulator.

9. The pulse radar system according to claim 1, further comprising at least one further receive path with corresponding receiving antennas, reception-side mixers, reception-side pulse modulators, further signal splitters and pulse signal sources.

10. The pulse radar system according to claim 9, wherein the reception-side pulse modulators of the at least one further receive path are connected via the further signal splitters, which are downstream from the high-frequency source.

11. The pulse radar system according to claim 9, further comprising a plurality of receive paths and a plurality of evaluation devices for evaluating a plurality of distance cells at the same time.

12. The pulse radar system according to claim 1, further comprising transmission-side and reception-side pulse signal sources phase-coupled to one another.

13. The pulse radar system according to claim 1, further comprising transmission-side and reception-side pulse signal sources, the reception-side pulse signal sources being phase-coupled among one another, and further comprising a plurality of receive paths.

14. The pulse radar system according to claim 1, wherein pulse duty factors of radar pulses in a transmit path and at least one receive path are different.

15. The pulse radar system according to claim 1, wherein radar pulses are PN coded, and the reception-side pulse modulators are controlled using a reception sequence corresponding to a set distance.

16. The pulse radar system according to claim 1, wherein a cross echo analysis is provided, such that, with a plurality of receive paths, a reception-side device is set to a PN code of a neighboring device.

17. The pulse radar system according to claim 1, wherein a superimposition of two orthogonal codes is provided in a transmit path, and a reception branch/path evaluates in each case only one of transmitted orthogonal signals.

* * * * *